W. SCHELLENBACH.
DIAMETER STOP FOR MACHINE TOOLS.
APPLICATION FILED JULY 1, 1913.

1,094,601.

Patented Apr. 28, 1914.
2 SHEETS—SHEET 1.

Witnesses:

Inventor:
William Schellenbach,
By Wood, Wood + Nathan,
Attorneys

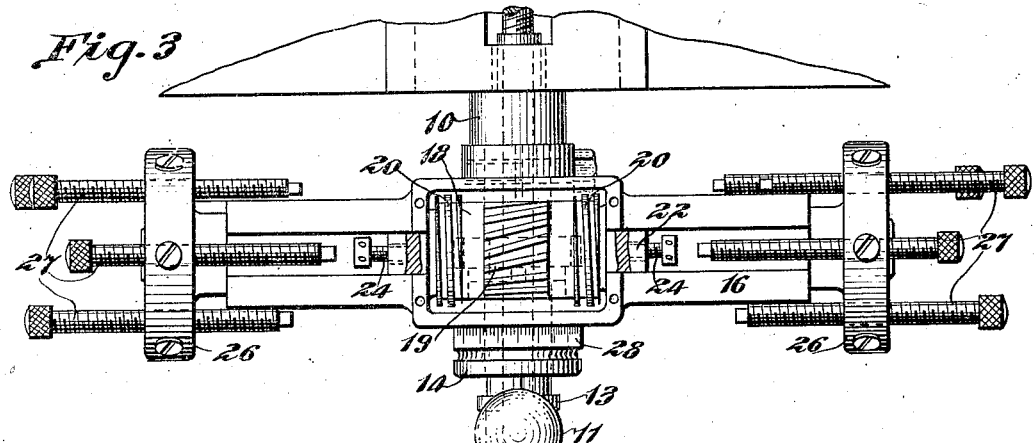
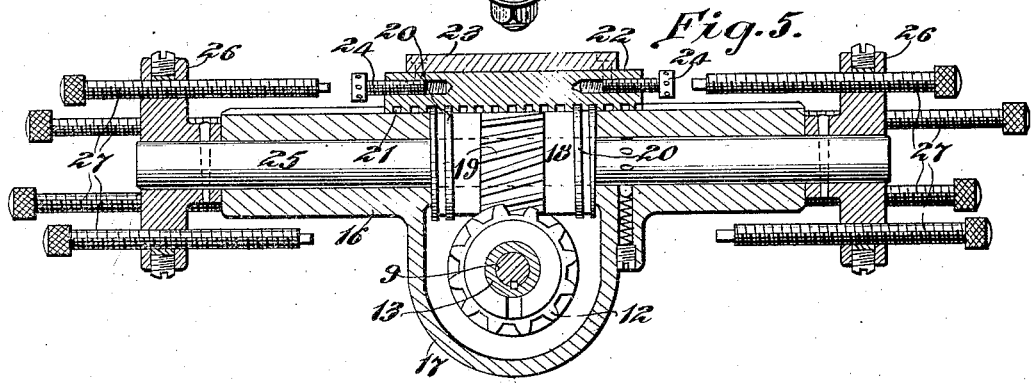
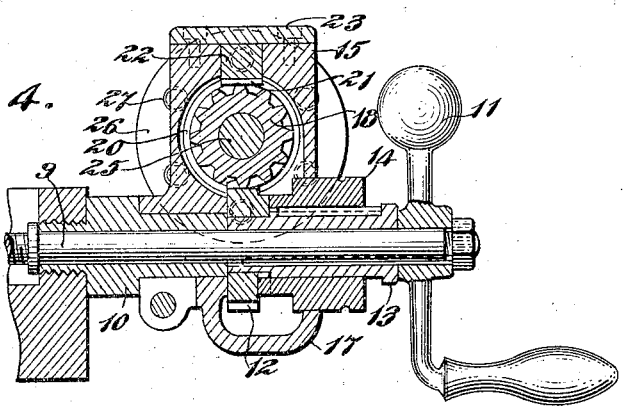

UNITED STATES PATENT OFFICE.

WILLIAM SCHELLENBACH, OF WYOMING, OHIO.

DIAMETER-STOP FOR MACHINE-TOOLS.

1,094,601.   Specification of Letters Patent.   Patented Apr. 28, 1914.

Application filed July 1, 1913. Serial No. 776,759.

*To all whom it may concern:*

Be it known that I, WILLIAM SCHELLENBACH, a citizen of the United States, residing at Wyoming, in the county of Hamilton and State of Ohio, have invented certain new and useful Improvements in Diameter-Stops for Machine-Tools, of which the following is a specification.

My invention relates to a stop mechanism for the cutter of a machine tool.

One of the objects of the invention is to provide in connection with a feed-screw shaft longitudinally adjusting a tool holder, a mechanism independently driven by the feed-screw shaft having provision for locking the screw against rotation at predetermined points corresponding to the position of the tool holder.

Another object of this invention is to provide a tool holder operated from one portion of the feed shaft and a driven member operated from another portion of the shaft, and providing stops for said independently driven member interlocking the screw against rotation at predetermined positions of the tool holder.

Another object of the invention is to provide a stop mechanism disposed entirely outside of the path of movement of the tool-holder.

Another object of the invention is to provide means for directly stopping the rotation of the feed shaft or prime-mover, instead of indirectly stopping it by bringing the tool-holder into contact with the stop positioned in its path of travel.

Another object of the invention is to provide accurate and positive stop mechanism adaptable for either external or internal diameter cutting, and which can be readily rendered operative or inoperative without any disorganization of the mechanism.

The features of the invention are more fully set forth in connection with the description of the accompanying drawings forming a part of this specification, and disclosing one of the preferred embodiments of the invention, wherein:—

Figure 1:
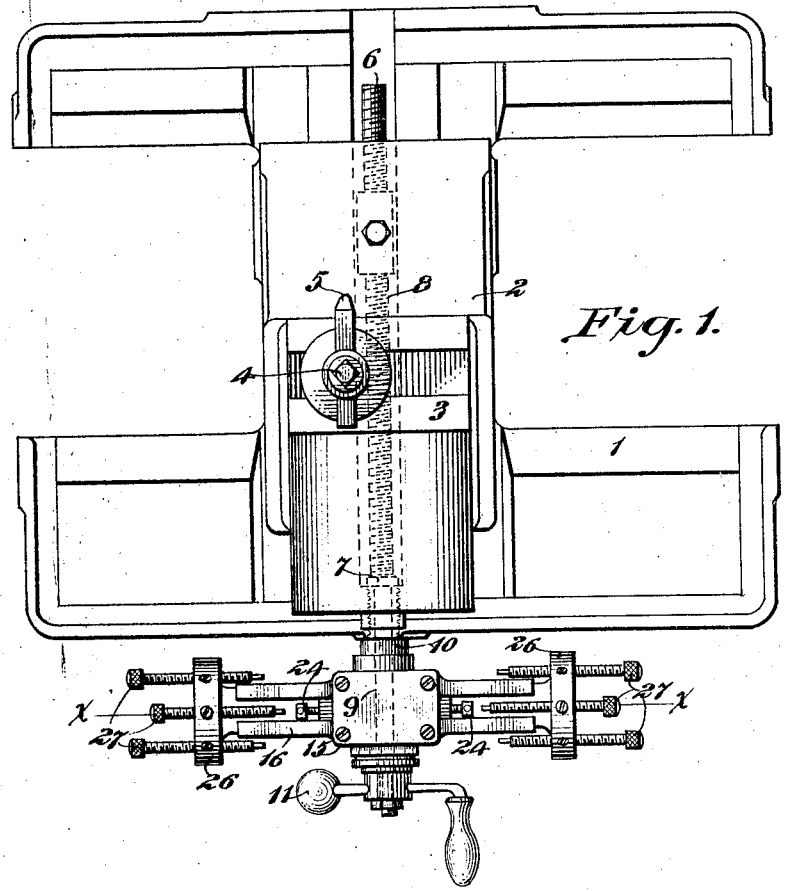
Figure 2:
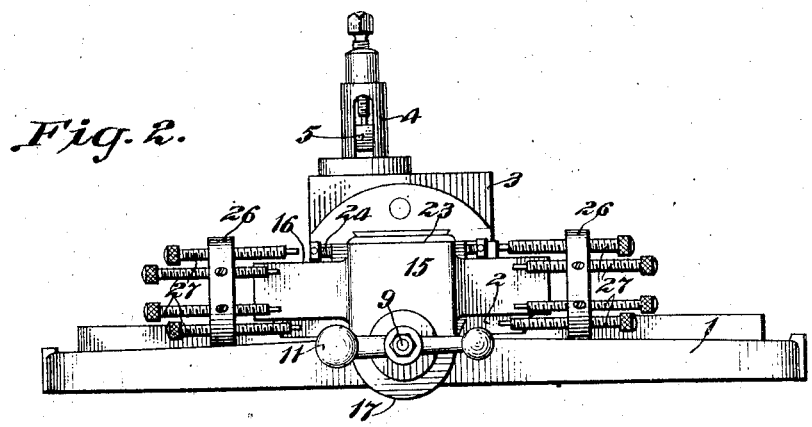

Figure 1 is a plan view showing my improvement applied to the carriage of a lathe. Fig. 2 is a front elevation. Fig. 3 is a plan view of my improvement with a housing cover removed. Fig. 4 is a central vertical section through Fig. 2. Fig. 5 is a section on line *x—x* of Fig. 1.

While my improvement is readily adaptable to various types of machine tools, it has special utility in connection with lathe work for diameter cutting, and I have illustrated the improvement as applied to a lathe carriage, although this is a matter of selection, and not a limitation of the principles of the invention.

In Fig. 1, 1 represents a carriage having the cross-slide 2, upon which the tool-holder 3 is guided, carrying the tool post 4 of the tool 5. Suitably mounted in the carriage or support is a feed-screw shaft 6 having its cylindrical portion formed with bearings 7 rotatively holding the shaft, restraining it against endwise movement, the screw portion 8 of the shaft having threaded engagement with the tool-holder, so as to move the tool-holder longitudinally of the shaft in directions appropriate to the rotation of the screw. The forward end of the shaft 9 projects through the front of the support or carriage, and turns in a bearing sleeve or bushing 10 screwed into the carriage, this sleeve 10 forming a support for the stop mechanism. The hand-feed 11 is shown fixed to the front end of the feed-screw shaft. At the end of the sleeve 10 I place a spiral gear 12 loose on the screw-shaft portion 9. 13 represents a sleeve fixed to the forward end of the shaft portion 9, and 14 is a clutch member splined thereto adapted to be moved longitudinally of the sleeve so as to rotatively connect or disconnect said spiral gear 12 with the feed-screw shaft. Bolted to the sleeve 10 is a casting 15 carrying my improved stop mechanism. The casting 15 is formed with a sleeve 16 extending transversely to the feed-screw shaft, having a housing portion 17 for the spiral gear 12. A rotary member 18 is rotatively mounted upon a shaft 25, but restrained from endwise movement. The rotary member 18 is formed with spiral threads 19 upon its intermediate portion intermeshing with the spiral gear 12. The member 18 and gear 12 rotate at right angles to one another by reason of the angular relationship of their intermeshing surfaces. The member 18 is also formed with the external screw-threads 20 at the opposite ends thereof. The screw-threads 20 intermesh with the rack teeth 21 of a reciprocating member 22 longitudinally guided on the upper surface of the sleeve 16. 23 represents an upper housing cover, secured to the casting 15. Preferably I provide the reciprocating or driven member 22 with bolts 24 at opposite ends thereof and projecting beyond the same, constituting adjustable surfaces for engaging the stops. Passing through the sleeve 16 is a spindle 25 carrying disks 26 at the outer ends thereof, each of said disks having a series of adjustable stop bolts 27 screw-threaded therein, and set to represent the predetermined diameters to be cut. If desirable, one of these stop bolts may remain unset for progressive cutting. The provision of the adjustable bolts 24 for the reciprocating member 22 gives a refinement of adjustment compensating for different settings or grindings of the tool. The spindle 25 may be rotatively adjusted to bring any one of the series of stops 27 into alinement with the reciprocating member 22, as shown in Fig. 3, the duplication of the disks rendering available stops for either external or internal diameter work. 28 represents an ordinary micrometer. The member 22 is non-rotatable, has reciprocating, rectilineal motion transversely to the feed screw, and hence the stop is engaged with an end thrust, desirable in precision work as well as heavy duty machine tools.

From this description it will be seen that when the tool-holder is fed by the rotation of the handle 11, the member 22 will be moved in an appropriate direction to bring its surface 24 into contact with a selected stop 27 to be engaged and that when such contact occurs the correlated abutting surfaces will be interlocked, instantaneously holding the feed-screw shaft against rotative or endwise movement, thereby arresting the feed of the tool-holder at a position predetermined by adjustment of the selected stop which is engaged by the member 22.

It will of course be understood that the series of stops 27 are set to correspond to the series of steps or shoulders representing the diameters to be cut.

By the use of my improvement superior precision work will be produced as the stop is instantaneous and accurate, the operation being to stop the rotation of the feed-screw shaft directly at predetermined points representing predetermined positions of the tool. The instant the bolts 24 and 27 contact they offer resistance to the influence of the hand feed interlocking the abutting, motion-transmitting surfaces in train from the feed-screw shaft to the driven member 22. The stop mechanism is positioned entirely away from the path of movement of the tool-holder, and is not located between the ways of the bed, where it would limit the capacity of the machine, and be badly in the way when other classes of work are being performed.

With my improvement when classes of work are being performed not requiring the stop mechanism, all that is necessary is to unclutch the spiral gear 12 from the feed-screw shaft, when the carriage and toolholder can be operated without the limitations of the stop mechanism. For instance, if a given stop is in position, the stop mechanism can be disconnected and the tool operated for any desired character of work, and the clutch can then be thrown in for rendering the already set stop operative for the next diameter work, and these operations can be successively performed with a given tool and on one piece of work.

It is readily apparent that the principle of this invention may be variously applied to various types of machine tools without departing from the scope of the claims, except wherein the same are specifically limited in expressed terms to preferred embodiments of the invention.

In the proposed embodiment of the invention it is preferable that the feed controlling or stop engaging member, be a rectilineally, reciprocating, non-rotatable member, also preferably moving transversely relative to the screw shaft, but this is not the essence of the inventive principle.

In the class of work for which this improvement is primarily designed, it is important that the screw driven feed controlling or stop engaging member shall have the capacity of and provision for arresting its movement in any one of a plurality of fixed, predetermined positions, successively available without requiring any readjustment of parts other than that of shifting the stops.

Having described my invention, I claim:—

1. In a device of the nature disclosed, a tool-holder, a feed-screw therefor, a non-rotatable feed-screw driven-member, and means to be engaged by said non-rotatable member for locking the screw against rotation at a predetermined position of the tool-holder.

2. In a device of the nature disclosed, a tool-holder, a feed-screw therefor, a member non-rotatably reciprocated by the screw independent of the tool-holder, and engaging means for said non-rotatable member to lock said screw against rotation at a predetermined position of the tool-holder.

3. In a device of the nature disclosed, a feed-screw therefor, a first member driven by the screw, a second member non-rotatably reciprocated by the screw transversely thereto, and a stop for said non-rotatable member to lock the screw against rotation at a predetermined position of the first member.

4. In a device of the nature disclosed, a rotary shaft, a first member reciprocated by the shaft longitudinally thereof, a second member non-rotatably reciprocated by the shaft transversely thereto, and a stop for said non-rotatable member arresting the rotation of the shaft at a predetermined longitudinal position of the first member.

5. In a device of the nature disclosed, a hand-operated rotary shaft, a first member longitudinally adjusted on and by the shaft, a non-rotatable member transversely reciprocated by the shaft to corresponding positions relative to the first member, and a plurality of stops adjustable in the motion path of the non-rotatable member arresting the rotation of the shaft at predetermined positions of the first member.

6. In a device of the nature disclosed, a rotary shaft, a first member taking motion from one portion of the shaft, a non-rotatable rectilineally moving member taking motion from another portion of the shaft, and a stop for said second member, whereby the movement of the first member in one zone of action is controlled by the stopping of the non-rotatable member in a different zone of action.

7. In a device of the nature disclosed, a rotary shaft, a first member taking motion at one portion of the shaft, a non-rotatable rectilineally moving member taking motion from another portion of the shaft, and a series of definite stops adapted to be selectively engaged with said non-rotating member, whereby the movement of the first member in one zone of action is controlled by the stopping of the non-rotatable member in a different zone of action.

8. In a device of the nature disclosed, a rotary shaft, a first member adapted to be longitudinally reciprocated by the shaft, a non-rotatable member taking motion from another portion of the shaft in directions corresponding to its rotation, and means for engaging said non-rotating member in either of its directions of movement to lock the shaft against rotation at a predetermined longitudinal position of the first member.

9. In a device of the nature disclosed, a rotary shaft, a first member moved by and longitudinally of the shaft, a non-rotatable member moved by the shaft outside of and transversely to the path of travel of the first member, and means for arresting the motion of the non-rotatable member at a predetermined position in the movement of the first member.

10. In a device of the nature disclosed, a rotary shaft, a first member taking motion from one portion of the shaft, a non-rotatable member taking rectilineal motion from another portion of the shaft, said members having corresponding relative rectilineal movements, the non-rotatable member being relatively lower-speeded, and a stop for said non-rotatable member arresting the rotation of the rotary shaft, at a predetermined adjusted position of the first member.

11. In a device of the nature disclosed, a hand-operated feed-screw shaft, a tool-holder longitudinally adjusted by and on the intermediate portion of the screw, a non-rotatable member reciprocated by and at one end of the shaft, and a stop for said non-rotatable member interlocking the screw against rotation at a predetermined position of the tool-holder.

12. In combination with the tool-holder and hand-operated feed-screw of a machine tool, means transversely reciprocated by the feed-screw outside of the path of tool-holder travel and coöperating stop mechanism adapted to lock the screw against rotation at a predetermined screw-controlled position of the tool holder.

13. In combination with a cross-feed screw-shaft of a machine tool, a tool-holder, longitudinally reciprocated by and on the screw-portion of the shaft, a member transversely reciprocated by one end of the shaft, and a stop for said member arresting the screw rotation at a predetermined screw-controlled position of the tool-holder.

14. In a device of the class described, a feed screw, a first member operated by the screw-rotation in a selected field, a non-rotatable member transversely reciprocated by the screw-rotation in an independent field, and a stop for said non-rotatable member arresting the screw-rotation at a predetermined position of the first member in its field of operation.

15. In a device of the nature disclosed, a support, a feed-screw therein, a tool-holder slide on the support longitudinally adjusted by the screw, a non-rotatable member reciprocated by one end of the screw at the end of the support, and a stop on said support to be engaged by said non-rotatable member to lock the screw against rotation at a predetermined screw-controlled position of the tool-holder slide.

16. In a device of the nature disclosed, a support, a feed-screw therein, a tool-holder slide on the support longitudinally adjusted by the screw, a reciprocating member at one end of the support operated by the corresponding end of the screw, and a series of definite stops adapted to be selectively engaged by said reciprocating member to arrest the rotation of the screw at a predetermined position of the tool-slide.

17. In a device of the nature disclosed, a support, a feed-screw therein, a tool-holder slide on the support longitudinally adjusted by the screw, a member on one end of the slide movable transversely relatively to the tool-holder slide, motion transmission between said member and the end of the screw, and a stop for said member to lock the screw against rotation at a predetermined position of the tool-holder slide.

18. In a device of the nature disclosed, a tool-holder, a feed-screw therefor, a member rotated by and at one end of the screw, a non-rotatable reciprocating member operated by said rotary member, and a stop for said reciprocating member, enabling the screw to be locked against rotation at a predetermined screw-controlled position of the tool-holder.

19. In a device of the nature disclosed, a tool-holder, a feed-screw therefor, a member rotated by and at one end of the screw, a non-rotatable reciprocating member operated by said rotary member, a stop for said reciprocating member, and an adjustable stop-engaging member on the reciprocating member.

20. In a device of the nature disclosed, a shaft, a work performing member, means transforming the rotary shaft motion into rectilineal motion of the work performing member, a feed controlling non-rotatable member, means transforming the rotary motion of the shaft into rectilineal motion of the controlling member, and a stop mechanism adjustable in the motion path of the controlling member.

21. In a device of the nature disclosed, a support, a rotary shaft, said support and shaft being formed with abutting surfaces closely confining endwise movement of the shaft, a driven member, said shaft and member having motion transmission connection constituting abutting surfaces interlocking when the motion transmission is resisted, a non-rotatable member moved by said driven member having an engaging surface, a stop having a surface to be engaged in the path of movement of said member, whereby said correlated abutting surfaces are respectively clamped together to lock the shaft against endwise and rotary motion in its support, when said engaging surface is urged against the stop surface, and a device independently adjusted by said shaft to positions determined by the point of contact of the movable member and its coöperating stop.

22. In a device of the nature disclosed, a support, a rotary shaft, said support and shaft being formed with abutting surfaces closely confining endwise movement of the shaft, a driven member, said shaft and member having motion transmission connection constituting abutting surfaces interlocking when the motion transmission is resisted, a member moved by said driven member having an engaging surface, a stop having a surface to be engaged in the path of movement of said member, whereby said correlated abutting surfaces are respectively clamped together to lock the shaft against endwise and rotary motion in its support, when said engaging surface is urged against the stop surface, said support being independently adjusted by said shaft to positions determined by the point of contact of the movable member and its coöperating stop.

23. In a device of the nature disclosed, a support, a rotary shaft, said support and shaft being formed with abutting surfaces closely confining the endwise movement of said shaft, a rotary member, said shaft and member having angularly disposed, intermeshing, rotary motion transmission elements constituting abutting surfaces when the rotary influence is resisted, a member to be longitudinally reciprocated by said rotary member having appropriate motion transmission connection therewith constituting abutting surfaces when the longitudinal motion influence is resisted, a stop in the path of said reciprocal member, said member and stop having surfaces to be abutted, whereby said correlated abutting surfaces are respectively clamped together to lock the shaft against rotary and endwise movement in the support when said reciprocating member is urged against the stop, and a device independently adjusted by said shaft to positions determined by the point of contact of said reciprocating element and stop.

24. In a device of the nature disclosed, a support, a feed screw shaft thereon, a tool holder guided on the support and engaging the screw, a rotary member geared to said shaft at one end of the path of movement of the tool-holder, a reciprocating member geared to the rotary member, and an adjustable member having a series of stops to be selectively engaged by said reciprocating member, thereby locking the screw against rotation and stopping the feed at a predetermined position of the tool holder.

25. In a device of the nature disclosed, a support, a feed screw shaft thereon, a tool holder guided on the support and engaging the screw, a rotary member geared to said shaft at one end of the path of movement of the tool holder, a reciprocating member geared to the rotary member, said reciprocating member having an adjustable stop-engaging surface, and an adjustable member having a series of stops to be selectively engaged by said reciprocating member, thereby locking the screw against rotation and stopping the feed at a predetermined position of the tool-holder.

26. In a device of the nature disclosed, a support, a feed shaft thereon, a tool holder guided on the support and engaging the screw, a rotary member geared to said shaft at one end of the path of movement of the tool holder, a reciprocating member geared to the rotary member, an adjustable member having a series of different length fixed stops and an adjustable stop adapted to be selectively engaged by said reciprocating member, thereby locking the screw against rotation and stopping the feed at predetermined positions of the tool holder.

27. A device adapted for connection to a feed shaft, comprising mechanism operated by said shaft, having a driven member moved in directions corresponding to the direction of rotation of the feed shaft, and a series of fixed stops adjustable in the path of movement of said driven member rendering said mechanism inoperative or operative as said stops are shifted into or out of position.

28. In a device of the nature disclosed, a support, a tool-holder guided thereon, a feed screw shaft on the support engaging the tool-holder, a non-rotatable reciprocating member on the support in front of the tool-holder guide, rectilinearly movable transversely to said shaft, motion transmission connection between said member and shaft, adapted to interlock when the movement of the reciprocating member is resisted, and a series of adjustable stops to be engaged by said reciprocating member.

29. In a device of the nature disclosed, a support, a tool-holder guided thereon, a feed screw shaft on the support engaging the tool-holder, a rotary member having angularly disposed rotary motion transmission connection with the shaft, a reciprocating member movable transversely to the shaft having intermeshing motion transmission connection with the rotary member converting the rotary into rectilinear motion, and a stop for said reciprocating member, said stop, rotary and reciprocating members being mounted on the support in front of the tool holder guide.

30. In a device of the class described, a support, a tool-holder guided thereon, a feed screw shaft on the support engaging the tool-holder, a rotary member geared to the shaft to rotate at right angles thereto, a reciprocating member geared to the rotary member to move transversely to the shaft, and stop disks adjustable in the path of movement of the reciprocating member, said members and stops being held by the support at one end of the tool holder guide.

31. In a device of the nature disclosed, a support, a feed shaft, a member movable longitudinally of and operated by one portion of said shaft, a member movable transversely of and operated by another portion of said shaft, and a stop for said transversely moving member adapted to lock said shaft against rotation to arrest the feed of the longitudinally moving member at predetermined points.

32. In a device of the nature disclosed, a support, a tool-holder, a feed screw shaft, a rotary member operated by the feed screw shaft at end of the path of movement of the tool-holder, means for rendering said rotary member inoperative, a non-rotatable member to be rectilineally reciprocated by said rotary member, and a stop for said member to be moved resisting the feed influence and interlocking the shaft against rotation, thereby arresting the movement of the tool-holder at positions determined by the point of contact of said stop and the member to be moved.

33. In a device of the nature disclosed, a support, a feed screw shaft, a tool-holder on the support adjusted by said shaft, a rotary member on the outer end of said shaft, a casting secured at the said outer end, and formed with a sleeve transverse to said shaft, a spindle passing through said sleeve, a second rotary element held by said sleeve and turning in said spindle, having an angularly intermeshing surface with the first rotary member, a reciprocating member on said sleeve, said second rotary member and reciprocating member having intermeshing surfaces converting the rotary into rectilineal movement, disks on the ends of said spindle, and stops on said disks adapted to be selectively alined in the path of movement of the said reciprocating member whose movement is to be arrested to lock the feed screw shaft against rotation.

34. A device of the nature disclosed combining actuating mechanism, means limiting the movement thereof at a plurality of successively available fixed stations, and a support moved by said mechanism independently of said means.

35. In a device of the nature disclosed, a shaft, a work performing member and a feed controlling member independently operated by said shaft, and means for successively arresting the movement of the feed controlling member in any one of a series of predetermined, fixed positions, thereby locking the shaft against rotation and stopping the work performing member in a series of predetermined positions.

36. In a device of the nature disclosed, a support, a feed mechanism therefor and a controlling mechanism operated by said feed mechanism independently of said support, comprising means successively available in predetermined fixed positions for rendering the feed mechanism inoperative.

37. In a device of the nature disclosed, a shaft, a primary work performing member operated by said shaft, a secondary feed controlling member also operated by said shaft, and a plurality of successively available fixed stops for arresting the movement of the secondary member, thereby rendering the shaft inoperative.

38. In a device of the nature disclosed, a shaft, a primary work performing member operated by said shaft, a secondary feed controlling member also operated by said shaft in either direction of shaft rotation, and a plurality of successively available fixed stops for arresting the movement of the secondary member in either direction of its movement, thereby rendering the shaft inoperative.

39. In a device of the nature disclosed, a feed mechanism, a first member operated thereby, a second member also operated thereby, and means for moving a series of abutments successively into and out of the path of movement of said second member, the feed mechanism being rendered inoperative or operative as said abutments are moved into or out of position.

40. A device of the class described combining actuating mechanism, means limiting the movement thereof at a plurality of successively available fixed stations, a support moved by said mechanism independently of said means, and mechanism for rendering said means operative or inoperative.

41. In a device of the nature disclosed, a feed mechanism, a first member operated thereby, a second member also operated thereby, means for moving a series of abutments successively into and out of the path of movement of said second member, the feed mechanism being rendered inoperative or operative as said abutments are moved into or out of position, and means for connecting or disconnecting said second member relative to the feed mechanism, thereby rendering said stop mechanism operative or inoperative.

In testimony whereof, I have hereunto set my hand.

WILLIAM SCHELLENBACH.

Witnesses:
OLIVER B. KAISER,
CLARENCE B. FOSTER.